US010575255B2

(12) United States Patent
Korneluk et al.

(10) Patent No.: US 10,575,255 B2
(45) Date of Patent: Feb. 25, 2020

(54) METHOD OF SCHEDULING WAKEUP EVENTS, METHOD OF OPERATING A MOBILE TRANSCEIVER, AND DEVICES CONFIGURED FOR SAME

(71) Applicant: BlackBerry Limited, Waterloo (CA)

(72) Inventors: Jose Eduardo Korneluk, Lake Worth, FL (US); Miguel Angel Rosario, Fort Lauderdale, FL (US); Sergio Domenech, Pembroke Pines, FL (US); Siddharth Saxena, Sunrise, FL (US); Jeffrey David McCranie, Coral Springs, FL (US)

(73) Assignee: BlackBerry Limited, Waterloo (CA)

( * ) Notice: Subject to any disclaimer, the term of this patent is extended or adjusted under 35 U.S.C. 154(b) by 272 days.

(21) Appl. No.: 15/231,070

(22) Filed: Aug. 8, 2016

(65) Prior Publication Data

US 2018/0041965 A1 Feb. 8, 2018

(51) Int. Cl.
| | | |
|---|---|---|
| *H04W 52/02* | (2009.01) | |
| *G01S 5/02* | (2010.01) | |
| *G01S 19/34* | (2010.01) | |
| *G01S 19/52* | (2010.01) | |
| *H04W 4/021* | (2018.01) | |

(52) U.S. Cl.
CPC ....... *H04W 52/0258* (2013.01); *G01S 5/0294* (2013.01); *G01S 19/34* (2013.01); *G01S 19/52* (2013.01); *H04W 4/021* (2013.01)

(58) Field of Classification Search
None
See application file for complete search history.

(56) References Cited

U.S. PATENT DOCUMENTS

| 8,554,243 B2 | 10/2013 | Klassen |
| 9,026,150 B2 | 5/2015 | Klassen |

(Continued)

FOREIGN PATENT DOCUMENTS

EP 2072951 A2 6/2009

OTHER PUBLICATIONS

Unknown Author, Ramer-Douglas-Peucker Algorithm, Wikipedia, https://en.wikipedia.org/wiki/Ramer%E2%80%93Douglas%E2%80%93Peucker_algorithm, at least as early as Oct. 16, 2015.

(Continued)

*Primary Examiner* — Chi H Pham
*Assistant Examiner* — Raul Rivas
(74) *Attorney, Agent, or Firm* — Ridout and Maybee LLP

(57) ABSTRACT

A method of scheduling wakeup events, method of operating a mobile transceiver, and devices configured for same are provided. In one aspect, there is provided a method of scheduling wakeup events for a mobile transceiver, comprising: obtaining a first GNSS data set comprising a plurality of GNSS coordinates, the first GNSS data set defining a route; applying a curve simplification algorithm to generate a second GNSS data set comprising a plurality of GNSS coordinates, wherein the second GNSS data set is a subset of the first GNSS data set; defining one or more alarms as wakeup events to activate the satellite receiver from a low power mode based on the plurality of GNSS coordinates of the second GNSS data, wherein the one or more wakeup events are each defined by an alarm; and applying the one or more alarms.

20 Claims, 7 Drawing Sheets

(56) References Cited

U.S. PATENT DOCUMENTS

| | | | | |
|---|---|---|---|---|
| 2014/0194147 A1* | 7/2014 | Kang | ................... | H04W 4/022 |
| | | | | 455/456.3 |
| 2014/0278044 A1* | 9/2014 | Jacobs | ................... | G06F 17/00 |
| | | | | 701/300 |
| 2016/0076883 A1* | 3/2016 | Korzunov | .............. | G01B 21/00 |
| | | | | 702/150 |
| 2016/0341564 A1* | 11/2016 | Cheng | ................ | G01C 21/3641 |

OTHER PUBLICATIONS

Douglas-Peucker Algorithm, Stack Overflow, http://stackoverflow.com/questions/6601824/douglas-peucker-algorithm at least as early as Oct. 16, 2015.

Notification of Transmittal of the International search report and written opinion; PCT/US2017/045591; dated Nov. 22, 2017.

Nicola Hanle et al.; "preprocessing position data of mobile objects"; Mobile Data Management, 2008, MDM'08, 9th international conference on , IEEEE, Piscataway, NJ, USA, Apr. 27, 2008.

International Prelminary Report on Patentability; PCT/US2017/045591 dated Feb. 21, 2019.

\* cited by examiner

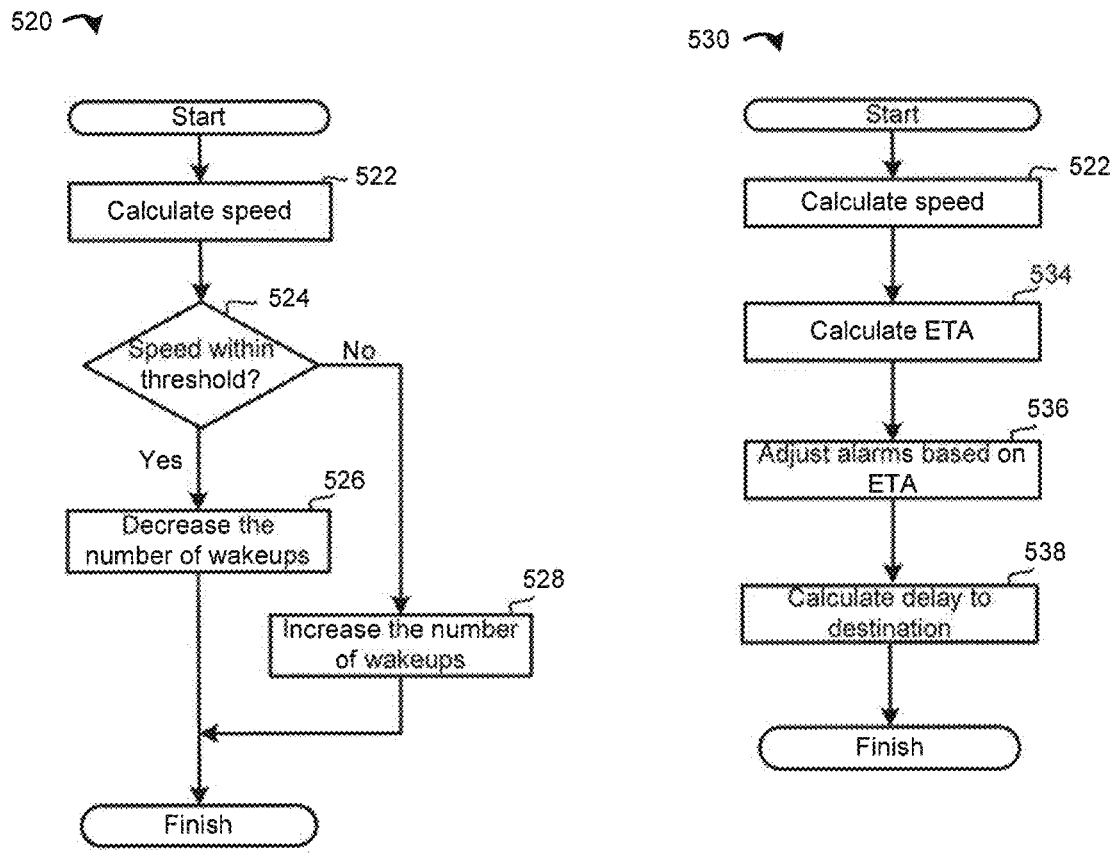
FIG. 5B
FIG. 5C
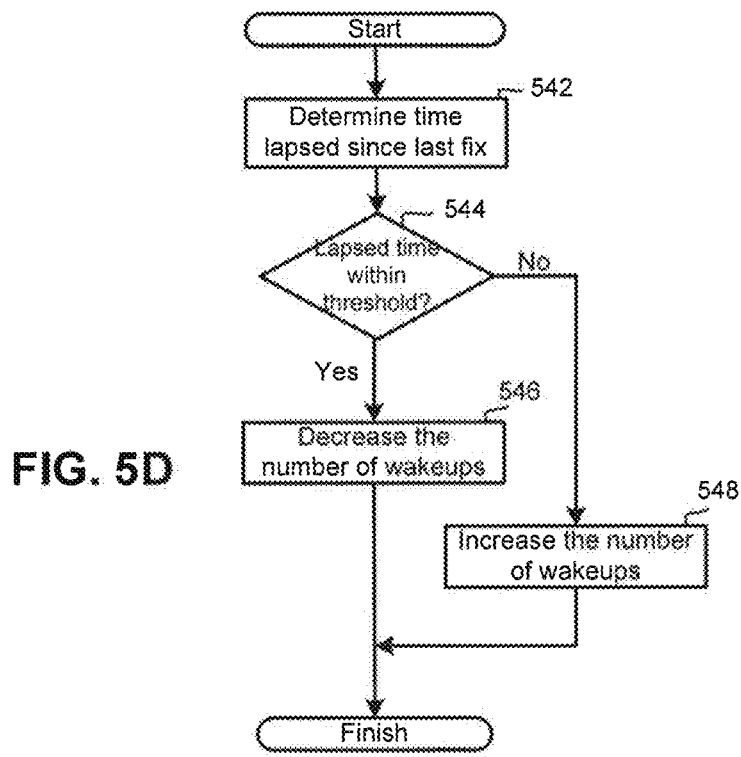
FIG. 5D

METHOD OF SCHEDULING WAKEUP EVENTS, METHOD OF OPERATING A MOBILE TRANSCEIVER, AND DEVICES CONFIGURED FOR SAME

TECHNICAL FIELD

The present disclosure relates generally to mobile transceivers, and more specifically, to a method of scheduling wakeup events, method of operating a mobile transceiver, and devices configured for same.

BACKGROUND

Global Navigation Satellite System (GNSS) tracking devices, such as Global positioning system (GPS) tracking devices, are devices carried by objects or persons ("carriers") which measure the location of the carrier using the GNSS at regular intervals and typically store the location in internal memory. There are three main types of GNSS tracking devices: a data logger, a data pusher and a data puller. A data logger stores the measured location data in internal memory for subsequent download and analysis. A data pusher (also known as a beacon) sends location data stored in internal memory to a server or other device in accordance with predefined parameters. A data puller (also known as a transponder) stores location data in internal memory and provides the location data in response to queries from a server or other device.

GNSS tracking devices typically have limited power and/or limited processing resources. Accordingly, methods of efficiently operating and deploying GNSS tracking devices are desirable.

BRIEF DESCRIPTION OF THE DRAWINGS

FIGS. 5A, 5B, 5C and 5D are flowcharts illustrating example embodiments of methods of operating a mobile transceiver in accordance with one embodiment of the present disclosure.

DESCRIPTION OF EXAMPLE EMBODIMENTS

Figure 1:
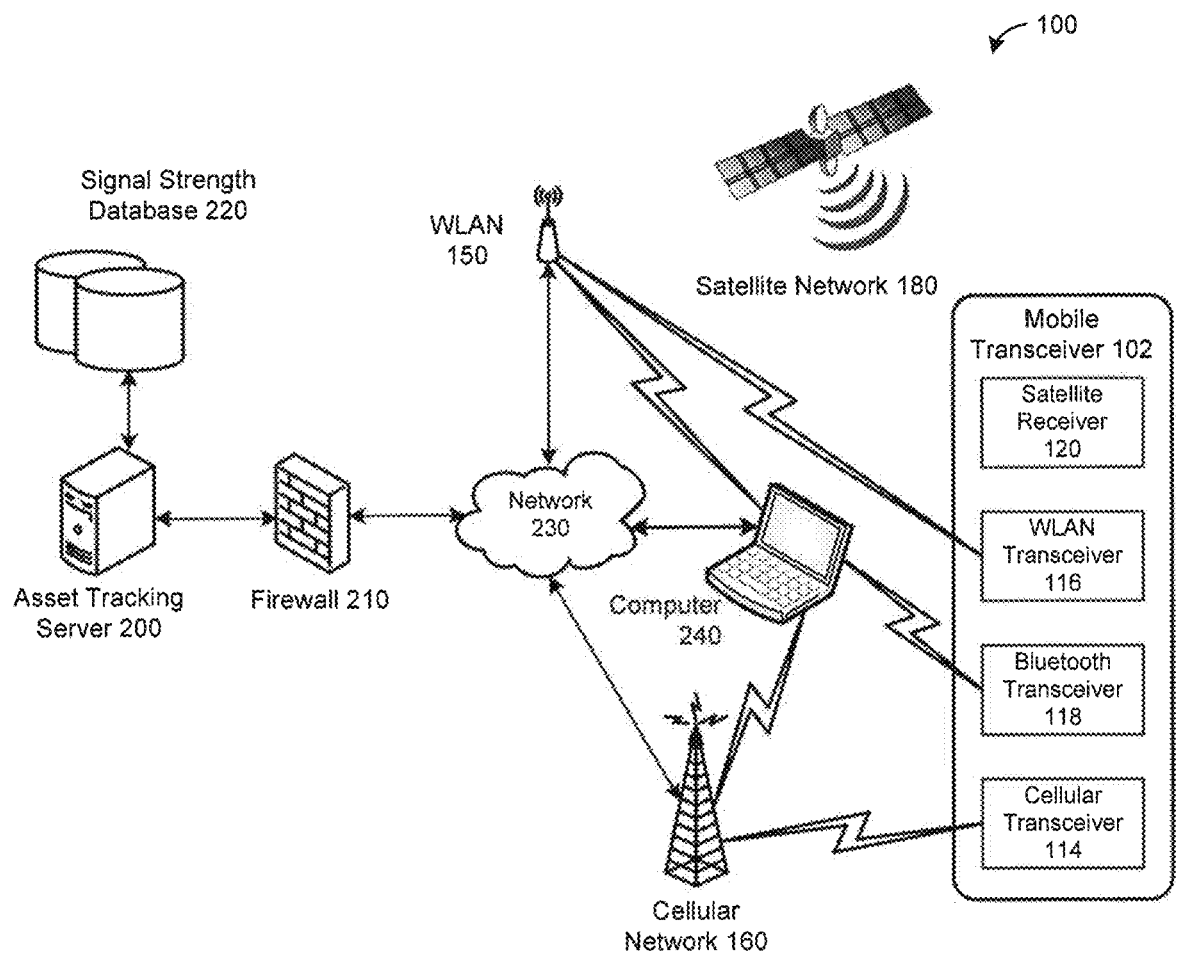
FIG. 1 is a block diagram illustrating a communication system suitable for operating a mobile transceiver in accordance with the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements can occur by way of messaging, function calls, shared memory space, and so on, without any such physical separation. As such, functions need not be implemented in physically or logically separated platforms, although illustrated separately for ease of explanation herein. Different devices can have different designs, such that while some devices implement some functions in fixed function hardware, other devices can implement such functions in a programmable processor with code obtained from a machine readable medium.

The present disclosure provides a mobile transceiver that allows global and long-range tracking applications in which an asset in global and long-range transit can be tracked even though it crosses wireless carrier and network coverage boundaries while in transit. In global and long-range tracking applications the mobile transceiver and the asset being tracked will cross wireless carrier and network coverage boundaries while in transit. For example, it is not uncommon for a shipping container to originate in mainland China and travel around South Africa with a final destination in North America. The mobile transceiver of the present disclosure includes one or more wireless transceivers which allow the mobile transceiver to communicate using one of a number of wireless services, such as 4G LTE, 3G, 2G, WLAN/Wi-Fi and/or Bluetooth, etc. to account for the various wireless services that may be available at any time while in transit.

When the mobile transceiver wakes up after a period of inactivity, the cellular service that was last used may no longer be available. Additionally, if crossing continental boundaries and international borders, the wireless access technology and RF bands may not overlap. The present disclosure provides methods of operating the mobile transceiver (e.g., tracking device) for global and long-range tracking that is power efficient and that extends the expected life of the battery of the mobile transceiver. This is particularly advantageous when the mobile transceiver is provided with a non-rechargeable battery or when a rechargeable battery is provided but the mobile transceiver is used in environments when an external power source to recharge the battery is unavailable.

In accordance with an example embodiment of one aspect of the present disclosure, there is provided a method of scheduling wakeup events for a mobile transceiver, comprising: obtaining a first GNSS data set comprising a plurality of GNSS coordinates, the first GNSS data set defining a route; applying a curve simplification algorithm to generate a second GNSS data set comprising a plurality of GNSS coordinates, wherein the second GNSS data set is a subset of the first GNSS data set; defining one or more alarms as wakeup events to activate a satellite receiver from a low power mode based on the plurality of GNSS coordinates of the second GNSS data, wherein the one or more wakeup events are each defined by an alarm; and applying the one or more alarms.

In accordance with another example embodiment of one aspect of the present disclosure, there is provided a method of scheduling wakeup events for a mobile transceiver, comprising: obtaining a first GNSS data set comprising a plurality of GNSS coordinates, the first GNSS data set defining a route; defining one or more alarms as wakeup events to activate a satellite receiver from a low power mode based on the plurality of GNSS coordinates of the first GNSS data; applying a curve simplification algorithm to generate a second GNSS data set comprising a plurality of GNSS coordinates, wherein the second GNSS data set is a subset of the first GNSS data set; decreasing the number of wakeup events based on the plurality of GNSS coordinates of the second GNSS data; and applying the one or more alarms.

In accordance with further example embodiments of another aspect of the present disclosure, there is provided a method of operating a mobile transceiver.

In accordance with an example embodiment of a further aspect of the present disclosure, there is provided a mobile transceiver, comprising: a processor; a memory coupled to the processor; a satellite receiver coupled to the processor; and a cellular transceiver coupled to the processor; wherein the processor is configured to perform the methods described herein.

In accordance with an example embodiment of a further aspect of the present disclosure, there is provided a non-transitory machine readable medium having tangibly stored thereon executable instructions for execution by a processor of a mobile transceiver, the mobile transceiver comprising a memory, a satellite receiver, and a cellular transceiver each coupled to the processor, wherein the executable instructions, when executed by the processor, cause the mobile transceiver to perform the methods described herein.

In accordance with an example embodiment of a further aspect of the present disclosure, there is provided a server, comprising: a processor; a memory coupled to the processor, the memory storing executable instructions that, when executed by the processor, cause the server to perform the methods described above and hereinafter.

In accordance with an example embodiment of a further aspect of the present disclosure, there is a non-transitory machine readable medium having tangibly stored thereon executable instructions for execution by a processor of a server, wherein the executable instructions, when executed by the processor, cause the server to perform the methods described above and hereinafter.

Figure 2:
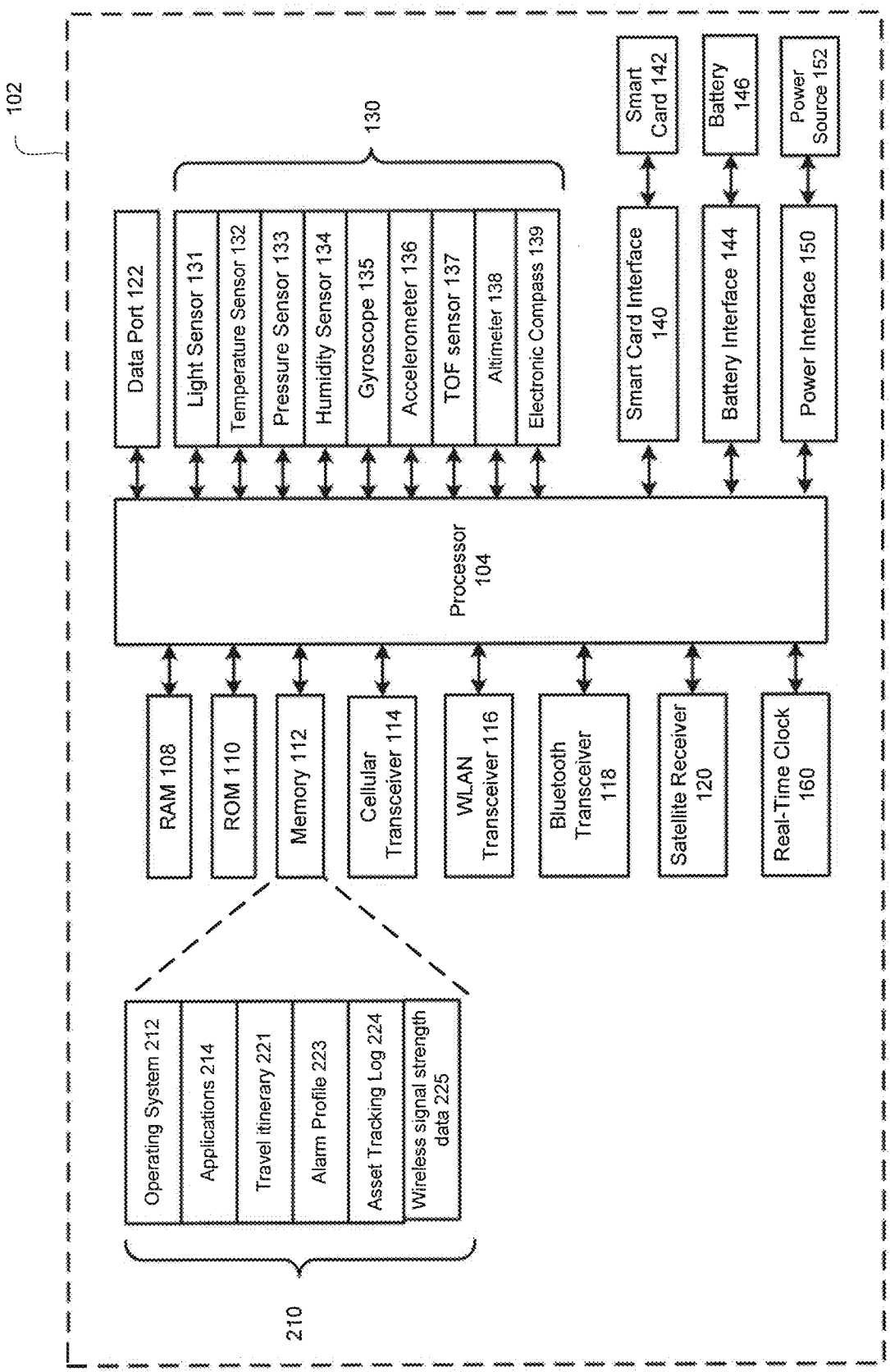
FIG. 2 is a block diagram illustrating a mobile transceiver in accordance with an example embodiment of the present disclosure.

Referring to FIGS. 1 and 2, an example embodiment of a mobile transceiver 102 of the present disclosure will be described. The mobile transceiver 102 comprises at least one processor 104 which controls the overall operation of the mobile transceiver 102. The processor 104 is coupled to a plurality of components via a communication bus (not shown) which provides a communication path between the components and the processor 104. The mobile transceiver 102 also comprises a Random Access Memory (RAM) 108, Read Only Memory (ROM) 110, a persistent (non-volatile) memory 112 which may be flash erasable programmable read only memory (EPROM) ("flash memory") or other suitable form of memory, a data port 122 such as a serial data port (e.g., Universal Serial Bus (USB) data port), a plurality of environmental sensors 130 for sensing the environment of the mobile transceiver 102, and a real-time clock (RTC) 160. The mobile transceiver typically also includes a power management integrated circuit (PMIC) for managing power requirements of the mobile transceiver 102.

The RTC 160 is a low power subsystem that runs even when the mobile transceiver 102 is in deep sleep mode. The RTC 160 typically comprises a crystal oscillator that provides accurate real-time information, such as those provided by Atmel Corporation.

The sensors 130 may comprise a light sensor 131, temperature sensor 132, pressure sensor 133, humidity sensor 134, gyroscope 135, accelerometer 136, one or more time-of-flight (ToF) sensors 137, altimeter 138, electronic compass 139 and possibly other sensors such as a door contact switch (not shown).

The mobile transceiver 102 also comprises a satellite receiver 120 for receiving satellite signals from a satellite network 180 that comprises a plurality of satellites which are part of a global or regional satellite navigation system. In some embodiments, a satellite transceiver capable of both receiving and sending satellite signals may be provided instead of a satellite receiver which can only receive satellite signals.

The mobile transceiver 102 uses signals received by the satellite receiver 120 from a plurality of satellites in the satellite network 180 to determine its position. In at least some embodiments, the satellite network 180 comprises a plurality of satellites which are part of at least one Global Navigation Satellite System (GNSS) that provides autonomous geo-spatial positioning with global coverage. For example, the satellite network 180 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

The mobile transceiver 102 also comprises one or more wireless transceivers for exchanging at least data communication. The wireless transceivers comprises at least a cellular (RF) transceiver 114 for communicating with a plurality of different radio access networks (RAN) such as a cellular network 160 using different wireless data communication protocols and standards. The mobile transceiver 102 may communicate with any one of a plurality of fixed transceiver base stations (one of which is shown in FIG. 1) of the cellular network 160 within its geographic coverage area. The mobile transceiver 102 may send and receive signals over the cellular network 160 after the required network registration and/or activation procedures have been completed. In the described embodiment, the cellular transceiver 114 is a multi-band transceiver that supports multiple radio frequency bands which may include, for example, multiple 4G Long-Term Evolution (LTE) or LTE Advanced bands as well as global 3G and 2G bands such as, for example, a TOBY-L2 series wireless transceiver from u-blox Holding AG of Switzerland. In other embodiments, multiple dedicated transceivers may be provided to support different wireless services, such as 4G LTE, 3G and 2G wireless services.

Examples of technologies that can be used by the cellular transceiver 114 include LTE, LTE Advanced, General Packet Radio Service (GPRS), Mobitex™, and Data TAC™. Other example technologies that can be used by the cellular transceiver 114 include Advanced Mobile Phone System (AMPS), time division multiple access (TDMA), Code Division Multiple Access (CDMA), Wideband code division multiple access (W-CDMA), Personal Communication Service (PCS), GSM (Global System for Mobile Communication), Cellular Digital Packet Data (CDPD), integrated Digital Enhanced Network (iDEN), High-Speed Downlink Packet Access (HSPDA), Evolution-Data Optimized (EvDO), Enhanced Data rates for GSM Evolution (EDGE), etc. Other types of communication networks, both separate and integrated, may also be utilized with the mobile transceiver 102. The mobile transceiver 102 may also be compliant with other communication standards such as 3GSM, 3rd Generation Partnership Project (3GPP), Universal Mobile Telecommunication System (UMTS), 4G, etc. The above-noted technologies are used by example and are not exhaustive. The described embodiments do not depend on any particular characteristics or capabilities of the RAN.

The wireless transceivers may also comprise a wireless local area network (WLAN) transceiver 116 for communicating with a WLAN 150 via a WLAN access point (AP). The WLAN 150 may comprise a Wi-Fi wireless network which conforms to IEEE 802.11x standards (sometimes referred to as Wi-Fi®). Other communication protocols may be used for the WLAN 104 in other embodiments.

The wireless transceivers may also comprise a short-range wireless transceiver, such as a Bluetooth® transceiver 118, for communicating with a computing device 240, such as a personal computer or tablet. The mobile transceiver 102 may alternatively communicate with the computer 240 using a physical link such as the data port 122 (e.g., USB port). The Bluetooth transceiver 118 could be compatible with any suitable version of the Bluetooth protocol including Bluetooth low energy (Bluetooth Smart). Other short-range wireless communication technologies may be provided instead of, or in addition to, Bluetooth® including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

Data received by the mobile transceiver 102 may be decompressed and decrypted by a decoder (not shown). The communication subsystem of the mobile transceiver 102 also includes one or more antennas, a processor such as a digital signal processor (DSP), and local oscillators (LOs). The specific design and implementation of the communication subsystem is dependent upon the wireless communication technologies implemented by the mobile transceiver 102.

Network access requirements vary depending upon the type of cellular network 160. In the described embodiment, the mobile transceiver 102 includes a smart card interface 140 for receiving a smart card 142 for storing and reading data by the processor 104. The smart card 142 may be a Subscriber Identity Module (SIM) card for use in a GSM network or other type of smart card for use in the relevant wireless network type which provides wireless network access. In at least some embodiments, the smart card 142 is a Universal Integrated Circuit Card (UICC) containing at least a SIM and a USIM application. UICC is the smart card used in most contemporary GSM and UMTS networks. While a SIM card for a GSM network has been described as an example, the term smart card is intended to encompass all types of smart cards and other similar technology for providing a Universal Subscriber Identity Module (USIM), Removable User Identity Module (R-UIM) or CDMA Subscriber Identity Module (CSIM) or other similar technology used in UMTS and CDMA networks.

The mobile transceiver 102 also includes a battery 146 as a power source. The battery 146 may be a rechargeable or non-rechargeable battery. The battery 146 provides electrical power to at least some of the components of the mobile transceiver 102. A battery interface 144 provides a mechanical and electrical connection for the battery 146. The battery interface 144 may be coupled to a regulator (not shown) which provides power V+ to the circuitry of the mobile transceiver 102. In some embodiments, the battery 146 is a large-capacity, non-rechargeable, sealed battery which is expected to have a relatively long service life, such as 5-7 years of active service.

The mobile transceiver 102 may also include a power interface, such as a power port, for connecting to an external power source 152 such as an alternating current (AC) power adapter or the computing device 240. The power interface may be a USB port or other port for connecting to the external power source via a cable. The mobile transceiver 102 can use the external power source 152 rather than the battery 146. If the battery 146 is rechargeable, the external power source 152 may be used to recharge the battery 146.

The memory 112 stores data 210, such as application data, and software modules comprising an operating system 212 and applications 214. The software modules or parts thereof may be temporarily loaded into volatile memory such as the RAM 108. The RAM 108 is used for storing runtime data and other data. The application data comprises a travel itinerary 221, an alarm profile and cellular signal strength data 225 collected by the mobile transceiver 102 when connecting or attempting to connect to a cellular RAN such as the cellular network 160.

Referring again to FIG. 1, an example communication system 100 in which a mobile transceiver 102 of the present disclosure can operate will be described. The mobile transceiver 102 typically uses the cellular network 160 to access an asset tracking service (e.g., an asset (or fleet) tracking server or asset management system) 200. The asset tracking service 200 may be implemented as one or more server modules and is typically located behind a firewall 210. The asset tracking service 200 provides administrative control and management capabilities over a plurality of managed mobile transceivers 102.

The asset tracking service 200 provides secure transmission of data exchanged between the asset tracking service 200 and the plurality of managed mobile transceivers 102. Communication between the asset tracking service 200 and the mobile transceivers 102 may be encrypted, for example, using Advanced Encryption Standard (AES) or Triple Data Encryption Standard (Triple DES) encryption.

The mobile transceiver 102 use signals received by the satellite receiver 120 from a plurality of satellites in the satellite network 180 to determine its position. For example, the mobile transceiver 102 may use the satellite receiver 120 to determine is location at regular intervals, in accordance with a predefined schedule, or in response to a trigger event, among other possibilities. The frequency or schedule at which the location is determined may be fixed or configurable. The mobile transceiver 102 stores the determined location, typically in terms of latitude and longitude, in a data log stored in the memory 112 of the mobile transceiver 102. The values for latitude and longitude may be specified in one of a number of different formats including degrees minutes seconds (DMS), degrees decimal minutes (DDM), or decimal degrees (DD). A time at which the location was determined is typically also stored in the data log. The data log is sometimes known as an asset tracking log 224.

The mobile transceiver 102 may also use one or more of the sensors 130 to sense or measure an environment of the mobile transceiver 102. For example, the sensors 130 may be used to measure temperature, pressure and humidity, as well as door open or movement events, among other parameters. The sensor data obtained via the sensors 130 and a time at which the sensor data was obtained are also stored in the data log (i.e., the asset tracking log 224), which is stored in the memory 112. The time may be specified using UTC time (Coordinated Universal Time), for example, as defined by International Telecommunications Union Recommendation (ITU-R TF.460-6). Time may be specified in 24 hr time hh:mm:ss format and date may be specified in dd:mm:yyyy format. Alternatively, local time may be supported. As with the location data, the mobile transceiver 102 may collect sensor data at regular intervals, in accordance with a predefined schedule, or in response to a trigger event, among other possibilities. The frequency or schedule at which sensor data is obtained may be fixed or configurable.

The mobile transceiver 102 attempts to connect to the asset tracking service 200 to report location and/or sensor data stored in the asset tracking log 224 at regular intervals, in accordance with a predefined schedule, or in response to a trigger event, among other possibilities. The frequency or schedule at which the mobile transceiver 102 attempts to connect to the asset tracking service 200 may be fixed or configurable. The mobile transceiver 102 typically attempts to connect to the asset tracking service 200 using a wireless transceiver such as the cellular transceiver 114. The mobile transceiver 102 has access to multiple wireless services provided by multiple wireless transceivers, each of which provides access to one or more wireless services. In the described embodiment, the multiple wireless transceivers comprise the cellular transceiver 114, WLAN transceiver 116, and Bluetooth transceiver 118. The wireless transceivers may include multiple cellular transceivers 114 in some embodiments, which may be multi-band cellular transceivers 114. The mobile transceiver 102 could also attempt to connect to the asset tracking service 200 using a physical link, either directly or indirectly via the computer 240. Each wireless service supported by the mobile transceiver 102 may be defined by a standard or specification. Non-limiting examples of wireless service described elsewhere in the present disclosure and include 4G Long-Term Evolution (LTE), 3G and 2G, WLAN and Bluetooth.

When the mobile transceiver 102 connects to the cellular network 160, WLAN 150, or computer 240 via Bluetooth and/or USB, the mobile transceiver 102 can send the data log or a portion of the data log (i.e., an unreported portion of the data log) to the asset tracking service 200 through the firewall 210 using a communication network 230. The data log information may be sent using any suitable message format including, for example, a proprietary message format. The mobile transceiver 102 data log typically includes an indicator regarding which data in the data log has been reported and which data in the data log is unreported. For example, in some embodiments, the data log comprises a series of records including and identified by a record identifier (ID). Each record also includes a time at which the record was made, location data and/or sensor data, and a report status indicating whether the record has been reported to the asset tracking service 200. After an unreported record is reported to the asset tracking service 200, its corresponding report status field in the data log is updated.

The mobile transceiver 102 powers-down certain device components when not in use to conserve battery power. For example, the mobile transceiver 102 initiates a low power mode for the cellular transceiver 114 after a reporting time/cycle. The low power mode may be an off mode (also known as an off state) in which the cellular transceiver 114 is unpowered or a sleep mode (also known as a standby mode or suspended operation mode) with low power consumption. The cellular transceiver 114 is then activated from the low power mode at the next reporting time/cycle. Any other wireless transceivers are similarly placed into a low power mode after a reporting time/cycle. The satellite receiver 120 and sensors 130 may also be placed into a low power mode when not obtaining location or sensor data, and then activated from the low power mode at the next measurement time/cycle.

The data logging and data reporting cycles are typically different and need not coincide, although the cycles typically overlap to varying degrees. For example, each reporting cycle typically involves reporting several records of the data log each including location data and/or sensor data. The cycles may overlap in that location data and/or sensor data may be captured as part of a common process at some times or may be captured as part of a separate process performed just prior to reporting logged data to the asset tracking service 200. For example, a wireless transceiver may be awaken for reporting at the same time, or just after, the satellite receiver 120 and/or sensors 130 are awaken and location data and/or sensor data is captured.

The communication system 100 is provided for the purpose of illustration only. The communication system 100 is but one possible configuration of a multitude of possible communication network configurations for use with the mobile transceiver 102. Suitable variations will be understood to a person of skill in the art and are intended to fall within the scope of the present disclosure. For example, while individual networks have been represented for convenience, it will be appreciated that multiple networks of each type and intermediate networks connected to the shown networks may be provided. Also, the communication links represented in FIG. 1 can be implemented using public and/or private networks that can communicate using packet data technologies, such as X.25 or Internet Protocol (IP) based addressing and routing techniques. Some connections can be implemented as secure connections, for example, using Virtual Private Network (VPN) technologies.

Figure 3:
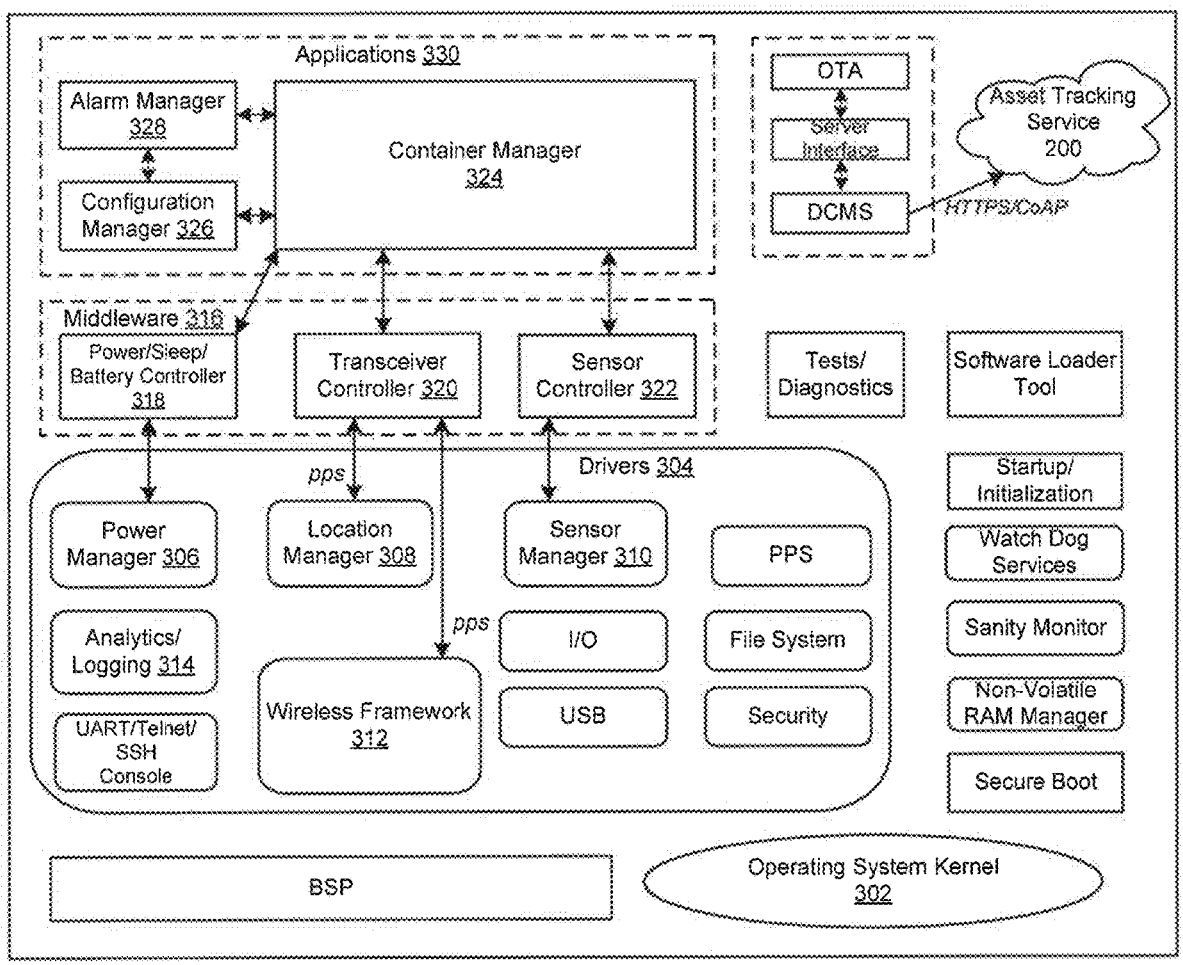
FIG. 3 is a block diagram of the software architecture of the mobile transceiver in accordance with the example embodiments of the present disclosure.

FIG. 3 is a block diagram of the software architecture of the mobile transceiver in accordance with the example embodiments of the present disclosure. The processor 104 may perform a number of processes using the stored software I in the memory 112 by interfacing with various hardware components of the mobile transceiver 102 as shown in the example of FIG. 3. The software modules include an operating system kernel 302, drivers 304, middleware 316 and applications 330. The drivers 304 include a power manager 306, a location manager 308, a sensor manager 310, a wireless framework 312, and an analytics/data logging module 314. The middleware 316 includes a power/battery/sleep controller 318, transceiver controller 320, and sensor controller 322. A number of applications 330 execute on top of the operating system kernel 302 such as a container manager (asset manager) 326, a configuration manager 326 and an alarm manager 328, as described in further detail below.

The container manager 324 collects and packetizes data collected by the mobile transceiver 102, and sends it to the asset tracking service 200 through a server agent interface. The packetized data may use JSON (JavaScript Object Notation) formatting. The container manager 324 may also receive data from the asset tracking service 200 through the asset tracking service 200, which it processes or dispatches to the appropriate module. For example, received device configuration data is dispatched to the configuration manager 326.

The container manager 324 also receives notifications (events) from the server agent interface about network status. For example, whether all data has been transmitted and received by the asset tracking service or whether new data has been received from the asset tracking service.

Events received from the alarm manager 328 include instructions as to what data needs to be gathered and sent to the asset tracking service 200. The container manager 324 follows the instructions received from the alarm manager 328 and collects and packetizes the data that is then transmitted to the asset tracking service 200. For example, an alarm event may specify that location, temperature, humidity and light level should be collected and sent to the asset tracking service 200.

Any data that is not received by the asset tracking service 200 is saved in the file system in memory 112 and an attempt to send the queued data may be made the next time an alarm is triggered and communication is established to the asset tracking service 200. The amount of queued data is based on the capacity of the memory 112. Once the memory 112 is full, older data is overwritten. In some embodiments, the backup data allows storage of 100,000 events with each event having a size approximately equal to 1 KB. The total amount of memory 112 may be 100 MB. The asset tracking service 200 acknowledges any received data so that the mobile transceiver 102 may discard acknowledged data. Alternatively, the data may be maintained within the memory 112, for example, for diagnostic purposes until overwritten.

The container manager 324 also controls the wireless transceivers and satellite receiver 120 through the middleware layer, for example, using a Persistent Publish/Subscribe (PPS) interface provided by the wireless framework, such as that provided by QNX Software Systems Limited.

In some embodiments, virtual sensors are provided. For example, "door" and "contents" sensors may be virtual in that to obtain door open/close status several physical sensors 130, such as accelerometer 136 and light sensor 131 may be used with an algorithm that detects the condition. The same may apply for contents full, empty or half condition. This value depends on an algorithm that considers the container dimensions and readings from the ToF sensor 137. As a result, not all "sensor" data transmitted to the asset tracking service 200 may not be raw readings obtained from physical sensors 130. Instead, some of the sensor data is converted by software on the mobile transceiver and converted to container conditions such as door state, container contents, etc. while other sensor data, such as temperature and humidity is directly obtained from physical sensors 130.

The configuration manager 326 receives, parses and stores device configuration data which stores an alarm profile, and receives and stores the container profile which includes data about the container to which the mobile transceiver 102 is attached. The device configuration data and container profile data may also be stored in the JSON format, and may be compressed and/or encrypted. The encryption/decryption and compression/decompression, if any, is done by the server agent interface and asset tracking service 200. The configuration manager 326 also validates any new device configuration data received from the asset tracking service 200 and reports back any errors.

The assigned device configuration data may be stored in the file system whereas the default device configuration is stored in ROM. Therefore, if the software is re-flashed this would completely update the file system and delete any assigned device configuration that have been downloaded and stored in the file system, which would then have to be obtained from the asset tracking service 200. An OTA update would not delete the configuration files saved in the file system as it uses a patching method to update files.

The alarm manager 318 receives the alarm profile from the configuration manager 326, and sets the alarms based on the active alarm profile. When a new device configuration is received by the configuration manager 326, it informs the alarm manager 328 so that the new alarm profile is applied. The old alarm profile may be deleted.

RTC 160 and at least some of the sensors 130 produce interrupts based on the programmed triggers which wakeup the processor 104. Sensors which do not produce interrupts cannot wakeup the processor 104. Instead, such sensors, when associated with an enabled alarm of the active alarm profile, are polled every time the processor 104 wakes up due to any of the other alarm types.

The RTC 160 is used for date-based and time-based alarm since it runs even when the mobile transceiver 102 is in deep sleep mode. The RTC 160 is configured with the next possible alarm date/time selected by the alarm manager 328 by searching all date and time alarms. Once the next date/time trigger is set in the RTC 160, it will generate an interrupt to wake up the processor 104 when the date/time is reached. It is possible for two or more date/time alarms to fall on the same calendar date and time. In such cases, when the RTC 160 may interrupt fire and the alarm manager 328 executes the instructions for all the matching date/time alarms. It is possible for the next date or time alarm to be due while processing an RTC interrupt generated alarm. For example, this can occur if the processing for a date alarm takes 3 minutes but the next time alarm is in 2 minutes. In such cases, the alarm manager 328 process the due alarm, as if it had triggered an interrupt, before programming the RTC 160 with the next date/time.

For maximum flexibility date-based and time-based alarms may be specified in local time based on container current location, specified using UTC time (Coordinated Universal Time), for example, as defined by International Telecommunications Union Recommendation (ITU-R TF.460-6). For simplicity, alarms may be limited to UTC time. To simplify time tracking, the RTC may be programmed with UTC time with all alarm events should be configured in UTC time. Time may be specified in 24 hr time hh:mm:ss format and date may be specified in dd:mm:yyyy format. Alternatively, date-based and time-based alarms may be specified in a given time zone, for example, the time zone for the customer headquarters. When local time is supported, UTC time can be converted to local time based on the time zone in which the container is located for RTC setup (for example, based on the time zone indicated by the cellular network) and alarm processing.

The alarm manager 328 configures the interrupt capable sensors based on the active alarm profile and possibly the enabled/disable status of the alarms in the active alarm profile, if supported. The sensors send an interrupt signal to wake up the alarm manager 328 when a trigger condition is detected. The alarm manager 328 wakes up and handles the interrupt, sending the corresponding event to the container manager 324 with the action instructions.

It is possible for two or more sensor alarms to be triggered at the same time, since a sensor value may satisfy the condition parameters for more than one alarm. In such cases, the alarm manager gathers the action instructions for all the matching alarms.

Nested alarm interrupts are also possible. For example, while processing an interrupt from the RTC 160 or sensor 130 another interrupt may be triggered. The alarm manager 328 handles each interrupt by queueing the interrupt requests and processing the requests in order. To facilitate processing and avoid endless loops, interrupts being processed may be acknowledged and re-enabled only after all processing is completed. After processing all triggered alarms, the alarm manager 328 may examine future alarm events and choose to process the future alarm events if scheduled to happen within a short period of time. This avoids waking up shortly after going to deep sleep.

The Power/Sleep/Battery Controller 318 provides the functions for managing the device power, battery and sleep mode, which may be implemented as an API that interfaces with the drivers. The Power/Sleep/Battery Controller 318 comprises three submodules a power manger, a battery manager, and a sleep manager. The power manger performs power management, such as setting correct voltage levels and CPU frequency to save device power consumption based on load.

The battery manager detects that a low battery level has been reached and the remaining expected battery life is below a critical threshold. When below the critical threshold, this condition will be sent to the asset tracking service 200. The battery manager may also provide a fuel gauge which provides battery status, charge level percentage, current voltage, consumption rate, expected life expectancy, etc. Alternately, if no fuel gauge is available, the battery manager will provide whatever information can be obtained, if any, for example, by reading the voltage level if possible.

The sleep manager performs the setting of the hardware into sleep mode. The container, configuration and alarm managers inform the sleep manager whether the modules are active or idle by using an API provided by the sleep manager. For this purpose, a shared memory semaphore, a shared memory bit map, an API interface, etc. may be used. Activity on the data port 122 indicates that a manufacturing tests and/or user debugging is being run, and that mobile transceiver 102 should not go to sleep.

To enter sleep in some embodiments, the wireless transceivers are powered off, some sensors may be powered off (for example, if there are no enabled alarms currently triggering on them), watchdog functions are disabled, the RTC 160 is to run and the device is set to run using the low speed clock, and the processor is set to sleep. The satellite receiver 120 is kept awake. Alternatively, the satellite receiver 120 may be powered off.

The alarm manager 328 sends the event to end sleep. Alarms triggered by interrupts are used to wake up the processor 104 from sleep. To complete the wake up, an event or a software interrupt is sent from the alarm manager 328 to the sleep manager. The container manager 324 and the configuration manager 326 inform the sleep manager that the modules are active as soon as events are received and the modules are waken up. When all processing has been completed by the modules, the modules send notifications to the sleep manager 328 that the modules have completed processing and ready to sleep.

To exit sleep in some embodiments, the wireless transceivers are powered on, some sensors that were powered off are powered on if needed by the active alarm profile, watchdog functions are enabled if needed, the RTC 160 is to run, the device is set to run using the high speed clock, and the processor is awaken. The satellite receiver 120 may be awaken if powered off and if needed.

Alternatively, the wireless transceivers power on/off determination could be implemented in the container manager 326 since it will know when the wireless transceiver is needed and when it may be turned off.

Alarms and Alarm Profiles

The alarm manager 428 sets alarms based on the active alarm profile and when alarms are triggered, processes the alarms, generates a device event, and sends the device event to the container manager 424 for processing. Each alarm profile defines one or more number of alarms. As described above, each of the alarms are defined by a trigger type, a trigger condition to be satisfied for the alarm to be triggered, and one or more actions to take when the alarm is triggered.

The alarm types are date-based, time-based, sensor-based, location-based (geofence) or a combination thereof. Alarms may be active (enabled) or inactive (disabled) and alarms may be enabled or disabled by other alarms that have been triggered. For example, if the temperature surpasses a trigger point, another alarm may be enabled to trigger if the temperature decreases below a lower value. Disabled/inactive alarms are ignored.

There are two sub-types of date-based and time-based alarms. The first type is frequency-based which specifies a frequency at which data is to be measured. An example value for a time-based frequency alarm is every 15 minutes. The second type is fixed and specifies a time and/or date at which the condition parameters for the alarm are checked. An example value for the frequency alarm is 12:00 PM every day.

The sensor-based alarms are defined based on the capabilities of the mobile transceiver 102, e.g. the onboard sensors 130. The sensor-based alarms may include temperature, humidity, pressure, movement detection, location, location within or with respect to a specific geofence, door open or closed condition, etc. A geofence is a virtual perimeter defined by a particular geographic area using geo-spatial coordinates, such as Latitude and Longitude, used by the satellite receiver 120. A geofence may be fixed or dynamically generated, for example, a radius around a particular point location. The geofence may be a predefined set of boundaries, or may be a set of zones or areas which need not be adjacent.

The location-based alarms (or geofence alarms) are based on the location of the mobile transceiver 102 determined by the satellite transceiver 120.

An alarm may be a one-time alarm, a countdown alarm, or a recurring ("forever") alarm. One-time alarms and countdown type alarms are disabled once the alarm happens or the countdown timer reaches zero. A disabled alarm may be enabled by other alarms.

A non-exhaustive list of alarm types is provided in the table below.

| Alarm Type | Example | Notes |
| --- | --- | --- |
| Time interval | Wake up at a given time interval. For example, every hour. May include an initial countdown number. | Specified in minutes. If a countdown number is specified, it is decremented every time this alarm is triggered. When it reaches zero, the alarm is disabled in volatile memory. If the device re-starts or a device configuration is reloaded from the asset tracking service the counter is reset. |
| Time of Day | Wake up at a given time of day. For example, at 12:00 PM. | Specified in 24 hr time hh:mm:ss format and UTC time. Can be specified as number of seconds since day start, UTC time. |

-continued

| Alarm Type | Example | Notes |
|---|---|---|
| Calendar Time | Wake up at a specific date and time. For example, at 12:00 PM on May 5, 2015. | Specified in time hh:mm:ss format and dd:mm:yyyy date format and UTC time. Can be specified as number of seconds in UTC time. |
| Door opens | Wake up if door is opened. | Detection of a door open event may involve one or more sensors. Triggered when the door is opened and it was previously closed. If the door remains open there are no additional triggers. |
| Door closes | Wake up if door is closed. | Detection of a door close event may involve one or more sensors. Triggered when the door is closed and it was previously open. If the door remains closed there are no additional triggers. |
| Door opens and in geolocation | Wake up if door is opened and device is not within a geolocation | Check current location before alarm action is executed. |
| Significant movement detected | Wake up if there is a movement for more than the listed number of minutes. | Time in minutes. If this alarm is triggered, the movement timer for this alarm is reset and the next alarm may happen only after listed number of minutes occurs again. |
| No movement detected (stop) | Wake up if there is a no movement for more than the listed number of minutes. | Time in minutes. If this alarm is triggered, the stop timer for this alarm is reset and the next alarm may happen only after listed number of minutes occurs again. |
| Tilt detected | Wake up if there is tilt movement above a hardcoded threshold. | Triggered when the tilt is detected. If tilted state remains, there are no additional triggers. |
| Temperature above value | The temperature is above a given value. | In degrees Celsius. Triggered when temperature increases above listed value. If temperature remains above trigger, there are no additional alarms. |
| Temperature below value | The temperature is below a given value. | In degrees Celsius. Triggered when temperature decreases below listed value. If temperature remains below trigger, there are no additional alarms. |
| Humidity above value | The humidity is above a given percentage value. | In percentage value. Triggered when the humidity increases above listed value. If humidity remains above trigger, there are no additional alarms. |
| Humidity below value | The humidity is below a given percentage value. | In percentage value. Triggered when the humidity decreases below listed value. If humidity remains below trigger, there are no additional alarms. |
| Light level above value | The light level is above a given value. | In lumens value. Triggered when the light level increases above listed value. If he light level remains above trigger, there are no additional alarms. |
| Light level below value | The light level is below a given value, | In lumens value. Triggered when the light level decreases below listed value. If he light level remains below trigger, there are no additional alarms. |
| Pressure above value | The pressure is above a given value. | In kPa units. Triggered only when pressure increases above listed value. If he pressure remains above trigger, there are no additional alarms. |
| Pressure below value | The pressure level is below a given value. | In kPa units. Triggered only when pressure decreases below listed value. If he pressure remains below trigger, there are no additional alarms. |
| Container Vacant | Detected that container is vacant (empty). | Condition is either occupied or vacant, nothing in between. Triggered only when change from occupied to vacant. If container remains vacant, there are no additional alarms. Uses ToF sensor. |
| Container Occupied | Detected that container is occupied (full). | Condition is either occupied or vacant, nothing in between. Triggered only when change from vacant to occupied. If container remains occupied, there are no additional alarms. Uses ToF sensor. |

-continued

| Alarm Type | Example | Notes |
| --- | --- | --- |
| Battery charge below percentage | The battery charge percentage is below a given value | Battery charge value in percentage. Triggered when the battery charge percentage decreases below listed value. If charge percentage remains below trigger, there are no additional alarms. |
| Enter geofence | Detect if geofence was entered. | Specified as geofence name listed in geofence section of the configuration. Triggered only when geofence is entered. No additional alarms are triggered while inside the geofence. |
| Exit geofence | Detect if geofence was exited. | Specified as geofence name listed in geofence section of the configuration. Triggered only when geofence is exited. No additional alarms are triggered while outside the geofence. |
| Door opens and in geofence | Wake up if door is opened and device is inside a given geofence. | Must check if device is inside geofence before the alarm action is executed. If inside geofence treated as a door open alarm. Otherwise, the alarm is ignored. |
| Door opens and not in geofence | Wake up if door is opened and device is outside a given geofence | Must check if device is outside geofence before the alarm action is executed. If outside geofence treated as a door open alarm. Otherwise, the alarm is ignored. |

Alarm actions are actions to be performed when an alarm has been triggered. Alarm actions typically comprise gathering data and/or sending the data to the asset tracking service 200. The alarm actions typically specify the type of data to gather and/or the data to transmit to the asset tracking service 200 but may include other actions such as running diagnostics, changing the operating state of the mobile transceiver 102 or enabling or disabling an alarm in the active alarm profile, etc. A non-exhaustive list of alarm actions is provided in the table below.

| Alarm Action | Description |
| --- | --- |
| All sensors and geolocation | Read all sensors and get geolocation and report values. |
| Geolocation | Read GNSS location and report coordinates. |
| Temperature | Read Temperature sensor and report temperature. |
| Humidity | Read Humidity sensor and report humidity. |
| Altimeter | Read Altimeter sensor and report altimeter value. |
| Pressure | Read Pressure sensor and report value. |
| Tilt | Read tilt sensor and report tilt state, which may be tilted or not tilted. |
| Movement | Get movement delta value in minutes. |
| Capacity | Read capacity. Either vacant or occupied. |
| Container contents | Read time of flight sensor and report container contents status. Could be empty, full, half-full, etc. |
| Door status | Get door state. Either open or closed. |
| Geolocation | Read GNSS location and report geolocation coordinates. |
| None | No action taken. |
| In geofence | Read GNSS location and determine if device is within any of the configured geofences. |

If the geolocation is an alarm action, but the geolocation is not obtained after a timeout period, the location is sent to the asset tracking service 200 with a value of "not available" to indicate to the asset tracking service 200 that it could not be obtained.

Application of Alarm Profiles

Figure 7:
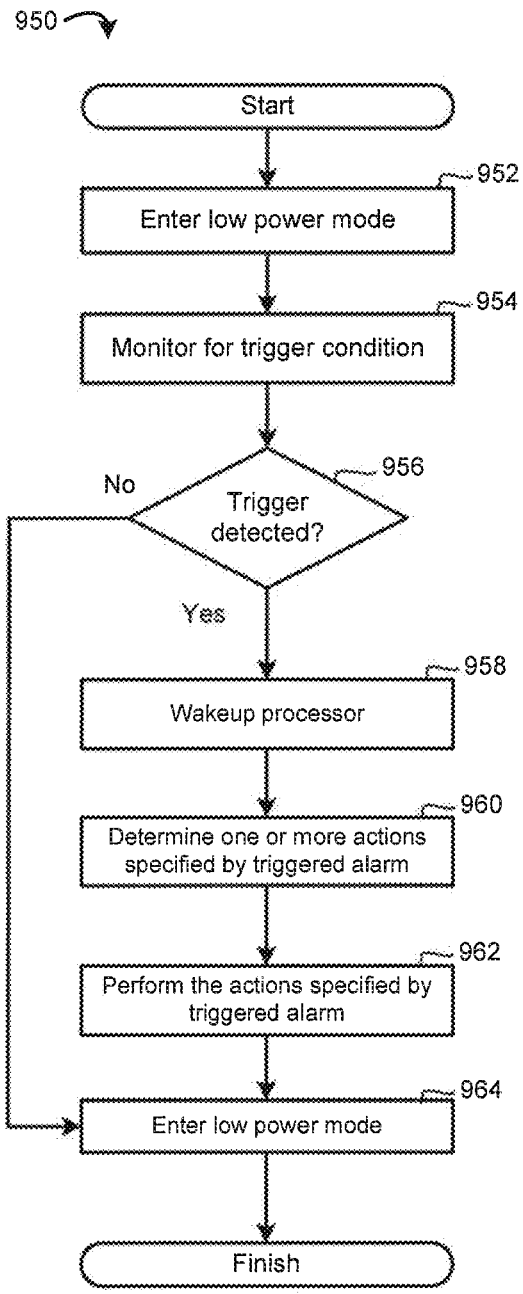
FIGS. 7 and 8 are flowcharts illustrating methods of operating a mobile transceiver in accordance with example embodiments of the present disclosure.
Figure 8:
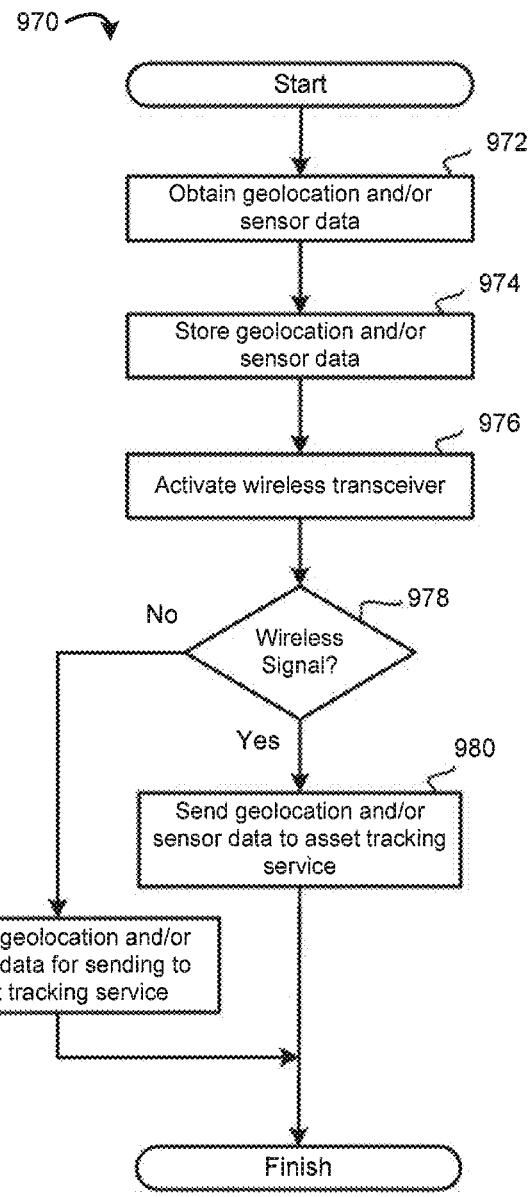

FIGS. 7 and 8 illustrate example methods 950, 970 of operating a mobile transceiver 102 such as a GNSS tracking device in accordance with one example embodiment of the present disclosure. The method may be carried out by software executed by a processor 104 of the mobile transceiver 102. Coding of software for carrying out such methods is within the scope of a person of ordinary skill in the art provided the present disclosure. The methods may contain additional or fewer processes than shown and/or described, and may be performed in a different order in other embodiments. Machine readable code executable by the processor to perform the methods may be stored in a machine readable medium such as a memory of the mobile transceiver 102.

Referring first to FIG. 7, at 952, the mobile transceiver 102 enters a low power mode, such as a sleep mode. The mobile transceiver 102 is in a sleep mode much of the time to conserve power and wakes up in response to alarms.

At 954, the mobile transceiver 102 monitors for one or more trigger conditions for one or more alarms in the active alarm profile while in a low power mode, such as a sleep mode. At 956, the mobile transceiver 102 determines whether a trigger condition has occurred. When interrupts are used, this step may be omitted. As noted above, the RTC 160 and at least some of the sensors 130 produce interrupts based on the programmed triggers which wakeup the processor 104. Sensors which do not produce interrupts cannot wakeup the processor 104. Instead, such sensors, when associated with an enabled alarm of the active alarm profile, are polled every time the processor 104 wakes up due to any of the other alarm types.

When a trigger condition is detected, at 958 the processor 104 wakes up after a period of inactivity in response to the alarm. The processor 104 typically wakes up from a sleep mode in which the processor 104 and one or both of the cellular transceiver 114 or satellite receiver 120 were in a low power mode. Typically, the cellular transceiver 114 or satellite receiver 120 are slept at 958 until the processor 104 determines that the cellular transceiver 114 or satellite receiver 120 are to be used. The alarm may be a date-based or time-based triggered by the RTC 160 or a sensor-based alarm based triggered by one or more of the sensors 130 which were active while the mobile transceiver 102 in the low power mode.

At 960, the mobile transceiver 102 determines one or more actions to be performed in response to the alarm. The actions may include one or more of obtaining data from the satellite receiver 120 and/or one or more sensors 130, reporting obtained data to the asset tracking service 200, or enabling/disabling one or more other alarms in the active alarm profile.

At 962, the determined actions are performed. Referring to FIG. 8, the processing of alarm actions in accordance with one example embodiment of the present disclosure will be described. At 972, when the actions specified by the alarm(s) which triggered the wakeup includes measure data using the satellite receiver 120 and/or sensors 130, the mobile transceiver 102 performs the data logging (acquisition) specified by the alarm.

Data logging may comprise determining its location and/or sensing its environment using the sensors 130. As a preliminary step, when the geolocation is to be obtained, the satellite receiver 120 is activated from a low power mode, which may be performed by the main processor 104 or the baseband processor 304, depending on the embodiment. Similarly, any sensors 130 to be used which were in a low power mode are activated.

At 974, the obtained geolocation and/or sensor data is stored in memory 112, in the asset tracking log, typically in association with a time at which the data was obtained.

At 976, when the action in response to the alarm which triggered the wake up in 702 includes reported data to the asset tracking service 200, the mobile transceiver 102 wakes up the wireless transceiver to be used, for example, the cellular transceiver 113. As a preliminary step, the wireless transceiver, e.g. cellular transceiver 114, is activated from a low power mode, which may be performed by the main processor 104 or the baseband processor At 978, the mobile transceiver 102 determines whether a wireless signal for the cellular transceiver 114 is available. When a wireless signal is available, processing proceeds to 980 at which the mobile transceiver 102 selects and accesses, or connects to, the wireless service, and sends the obtained geolocation and/or sensor data to the asset tracking service 200 using the wireless service.

At 982, when a wireless signal is not available, the obtained geolocation and/or sensor data is queued to send to the asset tracking service 200 the next time it connects, whether wirelessly by the wireless transceiver or wired by connection to a computing device 240.

Returning again to FIG. 8, at 964, after the mobile transceiver 102 has performed the actions specified by the triggered alarm, the mobile transceiver 102 enters a low power mode (e.g., sleep mode) in which the processor 104, cellular transceiver 114, satellite receiver 120 and possibly one or more sensors 130 are slept.

While the sending of obtained geolocation and/or sensor data is described, it will be appreciated that the full asset tracking log or portions thereof may be sent, not just the geolocation and/or sensor data that was obtained in 962.

The methods 800, 900, 920, 950 and 970 may be combined. For example, the mobile transceiver 102 may receive a new device configuration and new alarm profile any time it connects to the asset tracking service 200.

Method of Scheduling Wakeup Events and Method of Operating A Mobile Transceiver

Figure 4:
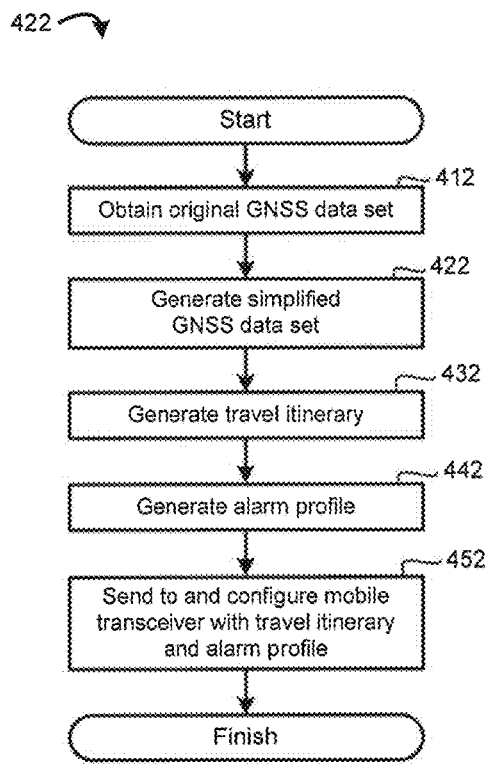
FIG. 4 is a flowchart illustrating an example embodiment of a method of scheduling wakeup events in accordance with one embodiment of the present disclosure.

In global and long-range tracking applications, an asset may travel along well-established long-distance routes over land and/or water. For example, it is not uncommon for a transport truck to originate in Mexico and travel through the USA and on to Canada. Similarly, a shipping container may originate in mainland China and travel around South Africa with a final destination in North America. Referring now to FIG. 4, an example of a method 400 of scheduling wakeup events in accordance with one example embodiment of the present disclosure will be described. The method may be performed by a mobile transceiver 102, such as a GNSS tracking device, the asset tracking server 200, or a combination thereof.

At 410, an original set of location data defining a planned, predefined route between an origin and a destination is obtained. The original set of data comprises at least a plurality of GNSS coordinates defining the route between the origin and the destination. The plurality of GNSS coordinates for the route may be obtained by the mobile transceiver 102 by obtaining a geolocation using the satellite receiver 120 while travelling along the route and storing the geolocation data in the asset tracking log 224. Advantageously, when the plurality of GNSS coordinates are obtained using the satellite receiver 120 while travelling along the route, additional information about the route may be obtained such as a time of arrival at each of the GNSS coordinates, a wireless signal strength indication (e.g., cellular signal strength indication) at each of the GNSS coordinates, a time zone at each of the GNSS coordinates and/or possibly other data. Alternatively, the plurality of GNSS coordinates for the route may be obtained from another source, such as a location service.

The route may be selected based on one or more of a number of possible factors. In some examples, the route is based on a signal strength database 220 connected to the asset tracking service 200 that includes a set of records correlating cellular signal strength with GNSS coordinates (e.g., GPS coordinates) so that wireless service should be available most of the time so that wireless service for reporting data to the asset tracking service 200 should be available for most or all of the planned route. In other examples, the route is based on a shorter distance. In yet other examples, the route is based on a shorter time. The route may also be selected to take into account one or more avoidances such as unpaved roads, low clearances, high traffic density or toll roads. The route may also be selected to take into account one or more preference such as highways over local roads.

At 420, an original GNSS data set comprising the plurality of GNSS coordinates is analyzed using a curve simplification algorithm to simply the original GNSS data set and generate a generalized travel path between the origin and the destination. Examples of algorithms for curve simplification include the Ramer-Douglas-Peucker, Visvalingam-Whyatt, Reumann-Witkam, Opheim simplification, Lang simplification and Zhao-Saalfeld. The algorithms, given a curve composed of line segments such as original curved travel path, generate a similar curve with fewer points. In other embodiments, curve fitting may be performed prior to curve simplification. In other embodiments, a smoothing algorithm may be used.

In one example, the curve simplification algorithm is an iterative end-point fit algorithm such as the Ramer-Douglas-Peucker algorithm (RDP). The algorithm receives the original GNSS data set that represents the original curved travel path as input and outputs a simplified GNSS data set composed of fewer number of data points that represents a simplified curved travel path. The simplified curved travel path consists of a subset of the original GNSS data asset that defined the original curved travel path.

The RDP algorithm recursively divides the original curved travel path. The first data point (i.e., origin) and last data point (i.e., destination) are automatically marked as data points to be kept. Next, it identifies the data point furthest from the line segment with the first data point and last data point as end points. This data point is the furthest on the curve from an approximating line segment between the end points. If the data point is closer than a threshold distance ε, ε>0, to the line segment then any data points not currently marked to be kept can be discarded without the simplified curve being worse than ε.

If the data point furthest from the line segment is greater than E from the approximating line segment then that data point must be kept. The RDP algorithm recursively calls itself with the first data point and the worst data point and then with the worst data point and the last data point, which includes marking the worst data point being marked as kept. When the recursion is complete, a simplified curved travel path is generated consisting of the data points that have been marked as kept.

The threshold distance ε defines the maximum distance between the original curve and the simplified curve (i.e., the Hausdorff distance between the curves). The threshold distance ε may be user-defined, for example by a system administrator. However, it can be made non-parametric by using the error bound due to digitization/quantization as a termination condition.

At 430, a travel itinerary is generated before travel based on the simplified curved travel path. The travel itinerary defines a number of waypoints including an origin, destination and a plurality of intermediate waypoints between the origin and destination. Each of the waypoints is defined by a GNSS coordinate corresponding to a data point in the simplified GNSS data set of the simplified curved travel path.

The travel itinerary may also define supplemental parameters for various waypoints in addition to a GNSS coordinate. The supplemental parameters may include one or more of a time or an expected time of arrival (ETA), a preselected wireless transceiver (if any) to be used for wirelessly connectively (e.g., for reporting data to the asset tracking service 200) (if any), a time zone or other data. Not all supplemental parameters may be defined for each waypoint and different supplemental parameters may be defined in other embodiments. The supplemental parameters may be obtained from the location data obtained by the mobile transceiver 102.

Depending on the curve simplification algorithm used in 420 or the implementation of the curve simplification algorithm, the matching supplemental parameters may be determined automatically along with the GNSS coordinates. Alternatively, the supplemental parameters may be determined by comparing the simplified GNSS data set to the original GNSS data set in the location data obtained by the mobile transceiver 102 to identify the matching additional information (e.g., time of arrival, wireless signal strength indication, time zone, etc.).

If a curve fitting is used, some of the data points in the simplified data set may be interpolated in which case the supplemental parameters may be determined by comparing the simplified GNSS data set to the original GNSS data set in the location data obtained by the mobile transceiver 102 to identify the GNSS coordinate in the original data set closest to the GNSS coordinate in the simplified data set. The additional information associated with the GNSS coordinate in the original data set closest to the GNSS coordinate in the simplified data set may then be determined and used for the travel itinerary.

The time of arrival can be converted to an ETA by determining a duration of time between waypoints in the simplified data set based on the time of arrival in the data set and a starting time for the trip. For example, if the time of arrival at waypoint no. 1 (the original) is 16:27:15 (hh:mm:ss format) UTC time and the time of arrival at waypoint no. 2 is 16:32:37 (hh:mm:ss format) UTC time, the duration of time between waypoints is 5 minutes, 22 seconds. If travel from the origin (waypoint no. 1) is initiated at 08:00:00 UTC (hh:mm:ss format) UTC time, the ETA at waypoint no. 2 is 08:05:22 UTC.

The preselected wireless transceiver (if any) to be used for wirelessly connectively can be determined based on the wireless network availability using the wireless signal strength indication (e.g., cellular signal strength indication) at each of the GNSS coordinates in the simplified GNSS data set in embodiments in which there is more than one wireless transceiver. If the cellular signal strength indication is below a threshold, no wireless transceiver may be specified in which case the wireless transceiver may not be activated. Instead, when the mobile transceiver 102 is out of wireless coverage for an extended period of time, the mobile transceiver 102 may be configured to wake up to obtain its geolocation using the satellite receiver 120 and/or acquire sensor data (e.g., environmental data) using one or more sensors 130 and store this data in the asset tracking log to be reported to the asset tracking service 200 at a future time when a wireless signal is available. A preferred wireless carrier, from a list of available carriers associated with each wireless transceiver (if there is more than one wireless carrier available at the waypoint) may also be specified in the travel itinerary.

Alternatively, the supplemental parameters may be obtained from other sources. For example, the ETA may be approximated based on a travel mode describing the mode of transportation for one or more legs of the journey (e.g., road, rail, boat, plane) and an average estimated speed based on the travel mode (e.g., speed limit or average speed of travel for the travel mode). For another example, the time zone could be obtained for each GNSS coordinate using a location service.

An example travel itinerary is presented in the table below.

| Event | Waypoint | GNSS co-ordinates | ETA (hh:mm:ss) | Wireless Transceiver | Time Zone |
|---|---|---|---|---|---|
| 1 | Origin | $GNSS_1$ | 06:00:00 | Transceiver 1 | UTC-6 |
| ... | In transit | GNSS ... | 10:08:00 | GNSS only | UTC-6 |
| n − 1 | In transit | $GNSS_{n-1}$ | 12:24:12 | Transceiver 2 | UTC-7 |
| n | Destination | $GNSS_n$ | 20:12:24 | Transceiver 3 | UTC-8 |

While an event number or ID and a waypoint descriptor are shown above, these are provided for the purpose of explanation and one or both of these parameters may not be provided in the travel itinerary stored in the memory 112 of the mobile transceiver 102. If waypoint descriptors are provided, it is contemplated that more detailed waypoint descriptors may be provided in other embodiments including, for example, one or more of "Rail", "Ship", "Street", "Dock", "Home", "Warehouse", "Distribution Centre", "Outside" or "Inside".

While the travel itinerary has been described as including certain data items and as having a certain data structure, the present disclosure is not intended to be limited to the described data structure. Any data structure in which the described data items are provided and associated with each other may be used, whether those data items are stored in a travel itinerary or elsewhere.

In other embodiments, the travel itinerary is the simplified curved travel path and operation 430 may be omitted.

At 440, one or more alarms (wakeup events) are set to coincide with one or more waypoints in the travel itinerary. The alarms may be date-based and/or time-based alarms. The alarms may be defined by an alarm profile which defines one or more alarms, each alarm being defined by a trigger type, a trigger condition to be satisfied for the alarm to be triggered, and one or more actions to take when the alarm is triggered. For example, fixed or set time alarms may be set for each of the waypoints in the travel itinerary or a subset of the waypoints in the travel itinerary based on an ETA associated with the waypoints. For another example, a frequency-based or duration-based time alarm may be set for one or more waypoints in the travel itinerary, e.g. the timer may be set for 15 minutes starting from when the mobile transceiver 102 departs the point of origin.

If one or more alarms have already been set, for example, setting the one or more alarms may comprise adjusting the one or more alarms based on the simplified route defined by the travel itinerary. For example, the duration of one or more countdown timers may be reduced.

The reduction in the number of waypoints in the travel itinerary (e.g., GNSS coordinates along the planned route) provided by curve simplification may allow the number of wakeup events to be reduced by increasing the duration of time-based alarms of the frequency type. As described above, one type of time-based alarm is a frequency-based alarm which specifies a duration or frequency for waking up the mobile transceiver 102 or a subsystem thereof to obtain location and/or sensor data and/or reporting the acquired location and/or sensor data to the asset tracking service 200. If the curve simplification results in a significant reduction in the number of waypoints compared to the number of original data set, the number of wakeup events which can be eliminated may be significant, thereby providing significant power savings.

The curve simplification can be performed repeatedly over time, for example as confidence in the simplified route used in the travel itinerary increases, such that the time between location fixes can be further extended when traveling long distances. For example, the mobile transceiver 102 may initially obtain location fixes starting at 5 minutes intervals and then progressively back off to 10 minutes, 15 minutes, 30 minutes, etc.

The specific characteristics of the satellite receiver 120 and/or a desired mode of operation of satellite receiver 120 may be taken into account when setting time-based alarms and/or date-based alarms. The satellite receiver 120 has a Time To First Fix (TTFF) which varies based on the number of channels being used (more simultaneous channels allowing quicker fixes) and whether the satellite receiver 120 operates from a hot start, warm start, or cold start. The TTFF is a measure of the time required to acquire satellite signals and navigation data, and calculate a location (called a fix).

A cold start or factory start occurs when satellite receiver 120 has inaccurate estimates of its position, velocity, the time, or the visibility of any of the satellites. In such cases, the satellite receiver 120 systematically searches for all possible satellites. After acquiring a satellite signal, the satellite receiver 120 can begin to obtain approximate information on all the other satellites, called the almanac. The almanac is transmitted repeatedly, typically over 12.5 minutes. Almanac data can be received from any of the satellites and is considered valid for up to 180 days.

A warm start or normal start occurs when the satellite receiver 120 has estimates of the current time (typically within 20 seconds), the current position (typically within 100 kilometers), and its velocity (typically within 25 m/s), and has valid almanac data. The satellite receiver 120 acquires a satellite signal and obtains that satellite's detailed orbital information, called ephemeris data. Typically, each satellite broadcasts its ephemeris data every 30 seconds and is valid for up to four hours.

A hot start or standby start occurs when the satellite receiver 120 has valid time, position, almanac, and ephemeris data, enabling a rapid acquisition of satellite signals. The time required of the satellite receiver 120 in this state to calculate a position fix may also be termed Time to Subsequent fix (TTSF).

On the first boot-up after mobile transceiver 102 is powered-on for the first time, for example, after the battery 146 is installed, the satellite receiver 120 may operate from a cold start. However, the satellite receiver 120 typically operates thereafter from a warm start (or hot start) thereafter. It is typically not powered-off again unless a device reset is required. Instead, it merely goes into various low power modes. A lower value may be used for time-based alarms when operating from a hot start than when operating from a warm start. Similarly, a lower value may be used for time-based alarms when operating from a warm start than when operating from a cold start. A TIFF may be as short as 30 seconds with a warm start and from ½ to 20 seconds with a hot start.

In some embodiments, time-based alarms and/or date-based alarms may be set to control the time between fixes so that the satellite receiver 120 always operates from a desired mode of operation, typically a warm start, a hot start or either a warm start or hot start (i.e., avoiding cold starts). However, the satellite receiver 120 could be operated from cold starts between fixes. Over the operational life of the mobile transceiver 102, avoiding operating from a cold start may conserve power by avoiding the additional processing associated therewith even after taking into account the power consumed by more frequently location fixes from a warm or hot start. In addition, by operating from a warm or hot start, establishes a lower threshold for the frequency of location fixes and/or a responsiveness of the satellite receiver 120 based on the TTFF of the desired mode of operation.

At 450, the one or more alarms set in 440 are applied by configuring the mobile transceiver 102 with the travel itinerary 221 and the alarm profile 223. If the travel itinerary and alarms were generated by the asset tracking service 200, the travel itinerary 221 and the alarm profile 223 are downloaded from the asset tracking service 200 at or before the beginning of a trip, for example, as part of an OTA device configuration update. If the travel itinerary and alarms were generated by the mobile transceiver 102, the travel itinerary 221 and alarm profile 223 are already stored in memory 112 and so are enabled or otherwise set as to an active status.

FIGS. 5A, 5B, 5C, 5D and 6 are example flowcharts of methods 500, 520, 530, 540 and 600 of operating a mobile transceiver 102 such as a GNSS tracking device in accordance with one example embodiment of the present disclosure. The methods may be carried out by software executed by a processor of the respective devices. Coding of software for carrying out such methods is within the scope of a person of ordinary skill in the art provided the present disclosure. The methods may contain additional or fewer processes than shown and/or described, and may be performed in a different order in other embodiments. Machine readable code executable by the processor to perform the methods may be stored in a machine readable medium such as a memory.

Figure 5A:
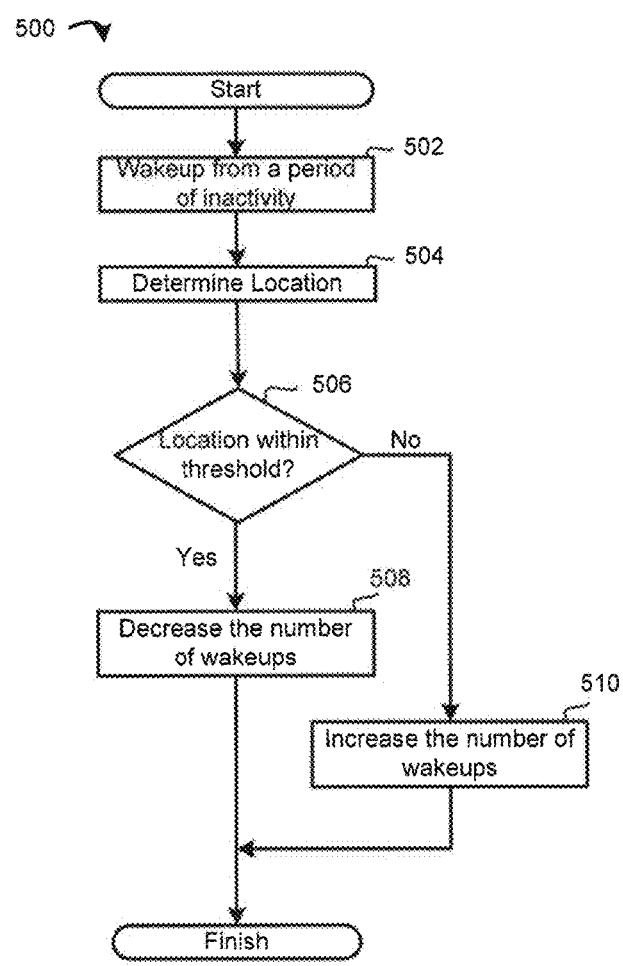

Referring first to FIG. 5A, at 502, the processor 104 and satellite receiver 120 wakes up (e.g., activate) from a low power mode in response to an alarm, such as a time-based alarm. This may be a multistep process.

At 504, the mobile transceiver 102 determines its location (geolocation) using the satellite receiver 120. The mobile transceiver 102 uses signals received by the satellite receiver 120 from a plurality of satellites in the satellite network 180 to determine its location. The mobile transceiver 102 stores the determined location, typically in terms of latitude and longitude, and a time at which the location was determined in the asset tracking log 224 stored in the memory 112 of the mobile transceiver 102.

The mobile transceiver 102 may also measure sensor data using one or more sensors 130, for example, based on one or more active alarms.

At 506, the mobile transceiver 102 determines whether the determined location is within a threshold distance of a waypoint in the travel itinerary 221. This involves comparing the GNSS coordinates of the determined geolocation with the GNSS coordinates in the travel itinerary. The threshold distance may be configurable depending on tracking requirements, for example, based on customer demands, the asset condition of the asset being tracked, or the travel mode describing a mode of transportation being taken. When strict compliance with the travel itinerary is desired, the threshold distance may be lower, such as 100 m to 200 m. When a strict compliance with the travel itinerary is not desired, the threshold distance may be higher such as 1 km to 2.5 km.

When it is determined that the location is within a threshold distance of a waypoint in the travel itinerary 221, the variation between the planned route and the route taken is within tolerance and the operations proceed to 508 at which the number of wakeups is decreased. This may comprise increasing the value of a timer of duration or frequency based time alarm, thereby decreasing the number of wakeups so that less frequent location fixes are obtained. For example, the duration of the time-based alarm may be increased from 5 minutes to 10 minutes.

When it is determined that the location is not within the threshold distance of a waypoint in the travel itinerary 221, the variation between the planned route and the route taken exceed tolerance and the operations proceed to 510 at which the number of wakeups is increased. This may comprise decreasing the value of a timer of duration or frequency based time alarm, thereby increasing the number of wakeups so that more frequent location fixes are obtained. For example, the duration of the time-based alarm may be decreased from 10 minutes to 5 minutes. Alternatively, no action may be taken when it is determined that the location is not within the threshold distance of a waypoint in the travel itinerary 221.

By changing the value of time-based alarms based on whether the variation between the planned route and the route taken exceed tolerance, a form of self-optimization may be obtained which balances power consumption and accuracy.

Referring to FIG. 5B, in the method 520, at 522 the mobile transceiver 102 calculates a speed of travel at which the mobile transceiver 102 is moving. The speed may be determined using one of many different techniques based on the satellite receiver 120 and/or sensors 130. For example, the speed of travel may be determined or calculated using location data obtained from the satellite receiver 120. Alternatively, the speed of travel may be determined from the asset tracking log 224 using the distance between the location determined at 504 and the last determined location in the asset tracking log 224 and the duration between those determinations. The calculated speed is stored at least temporarily in the memory 112.

At 524, the mobile transceiver 102 determines whether the calculated speed exceeds a threshold. When it is determined that the calculated speed exceeds the threshold, operations proceed to 526 at which the number of wakeups is decreased. When it is determined that the calculated speed does not exceed the threshold, the operations proceed to 528 at which the number of wakeups is increased. Alternatively, no action may be taken when it is determined that the calculated speed does not exceed the threshold.

Referring to FIG. 5C, in the method 530, at 522 the mobile transceiver 102 calculates a speed of travel at which the mobile transceiver 102 is moving as described above.

At 534, the processor 104 determines one or more estimated time of arrivals (ETAs) at the identified one or more of the next waypoints based on the calculated speed. The mobile transceiver 102 may calculate an ETA at the immediately next waypoint, a number of future waypoints in the travel itinerary, or all remaining waypoints between the determined location and the destination. It will be appreciated that the greater the number of waypoints for which an ETA is calculated, the more error may be introduced. However, if the ETAs are recalculated at every wakeup and the alarms adjusted at every wakeup, the error associated with the next waypoint may be kept relatively low.

At 536, the processor 104 uses the determined ETAs to set or adjust one or more time-based alarms. For alarms involving the cellular transceiver 114 (alarms with reporting actions), the alarms may be set to coincide with the ETA at a location for which cellular service is likely, as noted above.

At 538 the mobile transceiver 102 may calculate an estimated delay in an estimated time of arrival at the destination, if any, calculated by the mobile transceiver 102 based on a calculated speed of travel at which the mobile transceiver 102 is moving and the distance between the determined location and the destination following the planned route.

Referring to FIG. 5D, in the method 540, at 542 the mobile transceiver 102 determines the amount of time that has elapsed since a last location fix. When it is determined that the amount of time that has elapsed since a last location fix exceeds a threshold duration, operations proceed to 544 at which the number of wakeups is decreased. When it is determined that the amount of time that has elapsed since a last location fix does not exceed the threshold duration, the operations proceed to 548 at which the number of wakeups is increased. Alternatively, no action may be taken when it is determined that the amount of time that has elapsed since a last location fix does not exceed the threshold duration.

The mobile transceiver 102 may optionally interpolate points along the travel route to comply with the reporting requirements. For example, if the mobile transceiver 102 obtained three location fixes it may interpolate two additional points between the three location fixes to obtain a total of seven location fixes: three measured location fixes and four interpolated location fixes. This may be performed, for example, to satisfy a reporting requirement when location fixes could not be obtained due to obstructions, cloud cover, or other reasons. Any interpolation is performed before reporting location fixes to the asset tracking server 200. For example, the interpolated location fixes may be generated after obtaining a location fix if one or more previous location fixes could not be obtained.

Figure 6:
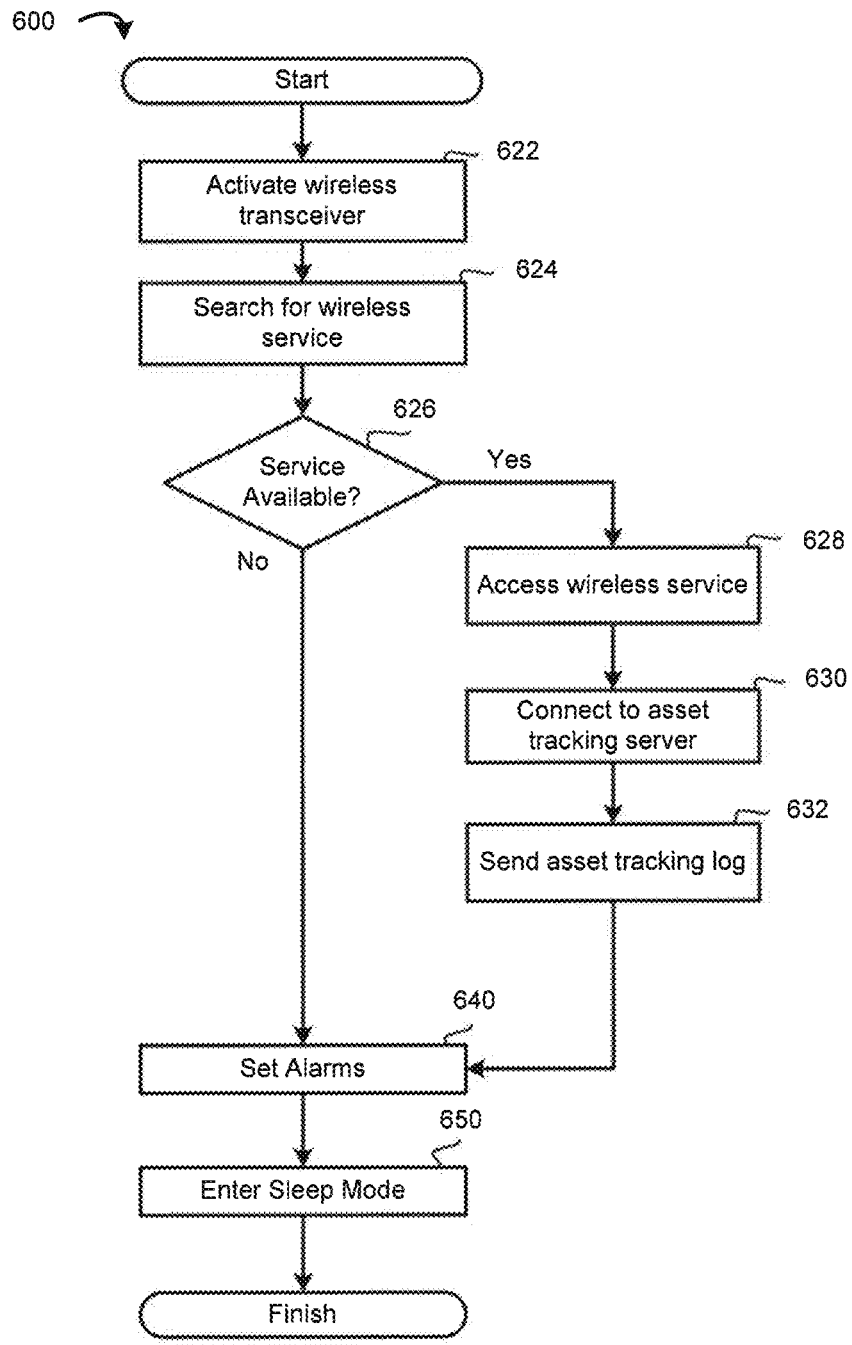
FIG. 6 is a flowchart illustrating an example embodiment of a method of reporting in accordance with one embodiment of the present disclosure.

Referring to FIG. 6, a method of reporting date to the asset tracking server 200 is described. The method 600 may be performed when the mobile transceiver 102 determines that wireless services are to be accessed based on the actions associated with the current alarm(s) (e.g., when reporting is required) and possibly also whether wireless service is likely. As noted above, wireless signal strength information may be associated with waypoints in the travel itinerary. The travel itinerary may also specify a particular wireless transceiver (e.g., cellular transceiver 114) to use if more than one is provided.

At 622, the mobile transceiver 102 activates a wireless transceiver such as the cellular transceiver 114 from a low power mode, such as a sleep mode. The activating of the last wireless transceiver may be performed by the main processor 104 or a baseband processor (not shown) of the cellular transceiver 114, depending on the embodiment.

At 624, when the wireless transceiver is the cellular transceiver 114, the cellular transceiver 114 searches (e.g., scans) for cellular service by searching for cellular signals. The cellular transceiver 114 may search for cellular signals in accordance with a priority sequence of frequencies which, for example, may be based on preferred carriers, for example, frequencies used by the carrier of the user's home network and/or carriers that have an advantageous partnering agreement with the carrier of the user's home network. The priority sequence may be a list of frequencies sorted or ranked in a descending order of priority. The scanning comprises measuring signal strength indications associated with one or more signals received from one or more respective cellular towers.

At 626, the mobile transceiver 102 determines whether wireless service is available. When wireless service is not available, operations proceed to 640 at which one or more alarms may be set. For example, the time-based alarm may be reset with the same duration used to wake the mobile transceiver 102 at 602. Other alarms may also be set or reset at this time. The mobile transceiver 102 may optionally update the wireless signal strength data 225 stored in memory 112 to indicate that no signal was detected at the determined location of the mobile transceiver 102. While the wireless signal strength data 225 and asset tracking log 224 are shown as separate entities, the wireless signal strength data 225 may comprise records in the asset tracking log 224.

When wireless service is available, operations proceed to 628 at which the mobile transceiver 102 accesses the wireless service. The mobile transceiver 102 may also update the wireless signal strength data 225 stored in memory 112 by storing the at least the determined signal strength indications and the determined location of the mobile transceiver 102.

If more than one wireless service is available, the mobile transceiver 102 may select one of the wireless services based on selection criteria, such as the signal strength indication, if the wireless service to be used has not been preselected. For example, the wireless service having the highest signal strength indication may be selected.

At 630, the mobile transceiver 102 connects to the asset tracking service 200.

At 632, the mobile transceiver 102 sends the asset tracking log 224 or a portion thereof to the asset tracking service 200.

The asset tracking service 200 stores the data contained in the received asset tracking log 224 in an asset tracking database (not shown) which may be accessed by a user, for example, using a web-based portal. A customer may login over the network to the asset tracking service 200 using a computer system 240, for example, by providing a valid username and password combination. The route monitoring may be provided as a value added service provided by a third party service provider who maintains or controls the asset tracking service 200. The route monitoring may be added while the mobile transceivers 102 are in transit, for example, via an over-the-air update of the device configuration by the asset tracking service 200.

Once the customer has logged in to web-based portal, the customer may be presented with a graphical user interface (GUI), such as a web-based interface, that permits the customer to add mobile transceivers 102 to their customer account, describe the asset with which the mobile transceiver 102 is associated (e.g. container ID, container measurements, contents, etc.), update alarm profiles for existing mobile transceivers 102, and/or view the retrieved data from existing mobile transceivers 102 associated with their customer account such as location and sensor data. The web-based interface may also indicate mobile transceivers 102 that have triggered alarm conditions.

The asset tracking service 200 may calculate an estimated delay, if any, based on a determination of the speed at which the mobile transceiver 102 is moving and the amount of the determined deviation from the planned route, if this information is not provided by the mobile transceiver 102. The speed of travel may be determined or calculated using location data in the asset tracking log 224 provided to the asset tracking service 200 by the mobile transceiver 102. The estimated delay may be indicated by the asset tracking service 200 in the web-based portal.

At 660, a low power mode is initiated for the mobile transceiver 102 or some of its subsystems as described above.

The methods 400, 500, 520, 530, 540, 600, 950 and 970, or portions thereof, may be combined.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The above-described method provides a power efficient global and long-range tracking method that reduces power consumption and extends the expected life of the battery of the mobile transceiver. As noted above, the mobile transceiver typically has a cyclical operation of sleep and wake states. The wake state typically involves fetching a GPS location and/or obtaining and/or processing sensor data and transmitting the data to an asset tracking service 200 via a cellular network. Transmission of the cellular data is typically the most power consuming event. It involves booting up the cellular transceiver 114, locating a cellular network, establishing a connection to the cellular network, and establishing a connection to the asset tracking service 200 and transmitting the necessary data.

The present disclosure provides a power saving scheme in which a route to be taken is planned in advance, and simplified to reduce the number of points along the planned route. Alarms (wakeups) are then set based on points along the simplified route. This conserves battery power and life by reducing the number of wakeups, reducing the number of unnecessary wakeups caused by repeatedly powering up the satellite receiver 120 along a well-established long-distance route to yield lat/long coordinates having little variance.

This avoids current-drain penalties of powering up the satellite receiver 120 and may significantly extend the life of the battery.

While the described embodiments related to a cellular signal strength database for use with the cellular transceiver, the teachings of the present disclosure could be applied to other wireless radio access technologies such as, for example, Wi-Fi. In one example, the signal strength database may be a wireless signal strength database for use with the wireless transceiver 116, with the signal strength database based on the signal strength of wireless access points in a wireless network conforming to the IEEE 802.11p standard. The wireless access points may be located along roadsides or elsewhere. IEEE 802.11p is an approved amendment to the IEEE 802.11 standard that adds wireless access in vehicular environments (WAVE), a vehicular communication system. It defines enhancements to 802.11 that support Intelligent Transportation Systems (ITS) applications, including data exchange between high-speed vehicles and between the vehicles and roadside infrastructure in the licensed ITS band of 5.9 GHz (5.85-5.925 GHz). IEEE 1609 is a higher layer standard based on the IEEE 802.11p.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar machine readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of scheduling wakeup events for a mobile transceiver, comprising:
   obtaining a first Global Navigation Satellite System (GNSS) data set comprising a plurality of GNSS coordinates defining a route;
   applying a curve simplification algorithm to generate a second GNSS data set comprising a plurality of GNSS coordinates defining the route, wherein the second GNSS data set is a subset of the first GNSS data set, wherein the second GNSS data has fewer GNSS coordinates than the first GNSS data set;
   defining one or more alarms as wakeup events to activate a satellite receiver from a low power mode based on the plurality of GNSS coordinates of the second GNSS data, wherein the one or more wakeup events are each defined by an alarm; and
   applying the one or more alarms.

2. The method of claim 1, wherein defining the one or more alarms comprises setting a duration of one or more time-based alarms.

3. The method of claim 1, wherein defining the one or more alarms comprises increasing the duration of the one or more time-based alarms.

4. The method of claim 2, wherein setting the duration of one or more time-based alarms comprises increasing the duration of the one or more time-based alarms.

5. The method of claim 1, further comprising:
   activating the satellite receiver from the low power mode in response a triggered alarm in the one or more alarms;
   determining a location of the mobile transceiver using the satellite receiver;
   storing the determined location in an asset tracking log.

6. The method of claim 5, wherein the sending comprises:
   activating a cellular transceiver from a low power mode;
   sending the asset tracking log to an asset tracking service using the cellular transceiver.

7. The method of claim 5, further comprising:
   determining whether the determined location is within a threshold distance of a waypoint of a travel itinerary defining a planned route, the travel itinerary comprising a plurality of waypoints including an origin, a destination, and a plurality of intermediate waypoints between the origin and the designation;
   wherein it is determined that the determined location is not within the threshold distance, adjusting the triggered alarm to increase the number of wakeup events.

8. The method of claim 7, further comprising:
   wherein it is determined that the determined location is within the threshold distance, adjusting the triggered alarm to decrease the number of wakeup events.

9. The method of claim 7, wherein the trigger alarm is a countdown timer, adjusting the triggered alarm to increase the number of wakeup events comprises decreasing a duration of the countdown timer.

10. The method of claim 8, further comprising:
    wherein it is determined that the determined location is within the threshold distance, increasing a duration of the countdown timer to decrease the number of wakeup events.

11. The method of claim 7, wherein the travel itinerary specifies a GNSS coordinate for each of the waypoints in the travel itinerary, wherein determining whether the determined location is within the threshold distance comprising comparing the GNSS coordinate of the determined location to the GNSS coordinates in the travel itinerary.

12. The method of claim 5, further comprising:
    calculating a speed of travel;
    determining whether the calculated speed of travel exceeds a threshold;
    wherein it is determined that the calculated speed of travel exceeds the threshold, adjusting the triggered alarm to increase the number of wakeup events.

13. The method of claim 5, further comprising:
    calculating a time elapsed since a last location fix;
    determining whether the time elapsed since the last location fix exceeds a threshold;
    wherein it is determined that the time elapsed since the last location fix exceeds the threshold, adjusting the triggered alarm to increase the number of wakeup events.

14. The method of claim 1, further comprising:
    calculating a speed of travel using location data obtained from the satellite receiver or an asset tracking log;
    identifying one or more subsequent waypoints in a travel itinerary defining the planned route;

determining one or more estimated time of arrivals (ETAs) at the one or more subsequent waypoints based on the calculated speed;

setting one or more alarms to be triggered at the one or more ETAs.

15. The method of claim 1, wherein the curve simplification algorithm is the Ramer-Douglas-Peucker algorithm.

16. The method of claim 1, wherein applying the one or more alarms comprises:

monitoring for one or more trigger conditions of the one or more alarms;

waking up a processor from a low power mode in response to detecting one of the trigger conditions;

identifying an alarm which was triggered based on the detected trigger condition by comparing the detected trigger condition to the one or more alarms;

determining one or more actions to be performed based on the identified alarm; and performing the determined one or more actions associated with the identified alarm.

17. The method of claim 16, further comprising:

before monitoring, initiating a low power mode for a main processor and wireless transceiver of the mobile transceiver.

18. A mobile transceiver, comprising:

a processor;

a satellite receiver coupled to the processor; and a cellular transceiver coupled to the processor;

a memory coupled to the processor, the memory storing executable instructions that, when executed by the processor, cause the mobile transceiver to:

obtain a first Global Navigation Satellite System (GNSS) data set comprising a plurality of GNSS coordinates defining a route;

apply a curve simplification algorithm to generate a second GNSS data set comprising a plurality of GNSS coordinates defining the route, wherein the second GNSS data set is a subset of the first GNSS data set, wherein the second GNSS data has fewer GNSS coordinates than the first GNSS data set;

define one or more alarms as wakeup events to activate the satellite receiver from a low power mode based on the plurality of GNSS coordinates of the second GNSS data, wherein the one or more wakeup events are each defined by an alarm; and apply the one or more alarms.

19. A non-transitory machine readable medium having tangibly stored thereon executable instructions for execution by a processor of a mobile transceiver, the mobile transceiver comprising a memory, a satellite receiver, and a cellular transceiver each coupled to the processor, wherein the executable instructions, when executed by the processor, cause the mobile transceiver to:

obtain a first Global Navigation Satellite System (GNSS) data set comprising a plurality of GNSS coordinates defining a route;

apply a curve simplification algorithm to generate a second GNSS data set comprising a plurality of GNSS coordinates defining the route, wherein the second GNSS data set is a subset of the first GNSS data set, wherein the second GNSS data has fewer GNSS coordinates than the first GNSS data set;

define one or more alarms as wakeup events to activate the satellite receiver from a low power mode based on the plurality of GNSS coordinates of the second GNSS data, wherein the one or more wakeup events are each defined by an alarm; and apply the one or more alarms.

20. The method in claim 1, wherein the plurality of GNSS coordinates of the second GNSS data set are in the same order as the plurality of GNSS coordinates of the second GNSS data.

* * * * *